May 3, 1960 J. REDEL 2,935,512
NEW GLUTACONIMIDES AND THEIR PROCESS OF PREPARATION
Filed Feb. 19, 1958
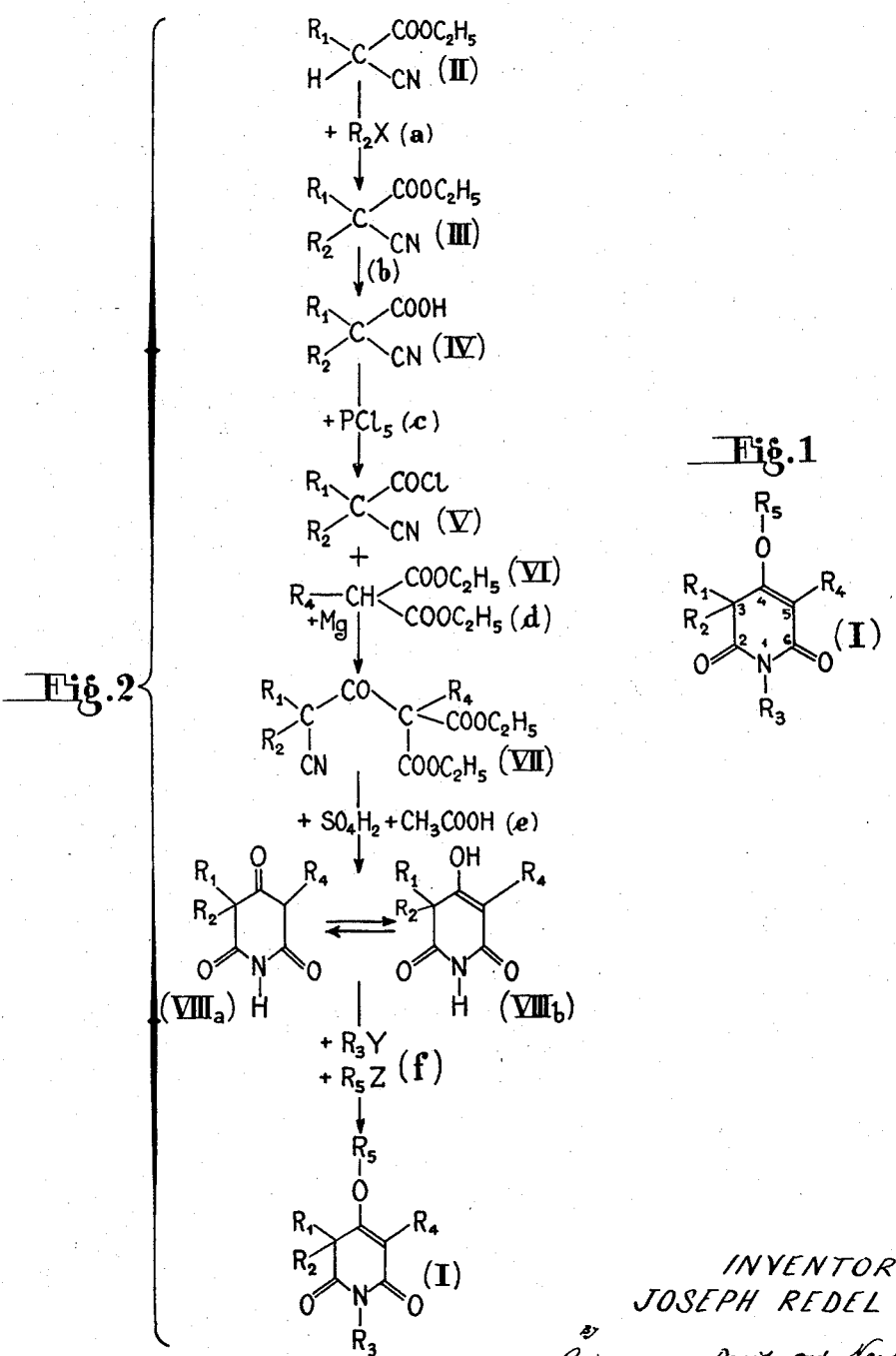
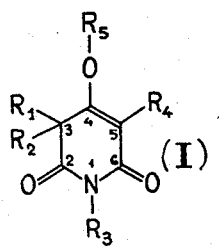
INVENTOR:
JOSEPH REDEL

United States Patent Office 2,935,512
Patented May 3, 1960

2,935,512
NEW GLUTACONIMIDES AND THEIR PROCESS OF PREPARATION

Joseph Redel, Paris, France, assignor to Chimie et Atomistique, Paris, France, a French body corporate Application February 19, 1958, Serial No. 716,217

Claims priority, application France February 22, 1957

6 Claims. (Cl. 260—281)

The object of the present invention is to provide new substituted glutaconimides having the Formula I shown in Fig. 1 of the accompanying drawing, in which $R_1$ and $R_2$ are each an aryl radical, such as phenyl, or alkyl and notably lower alkyl, $R_3$ is hydrogen, an alkyl radical, and notably a lower alkyl, or an N-substituted or non-substituted amino-alkyl radical, $R_4$ is hydrogen or an alkyl radical and notably a lower alkyl, and $R_5$ is an alkyl radical, in particular a lower alkyl or an N-substituted or non-substituted amino-alkyl radical.

These new compounds are of use as starting materials for the synthetic preparation of new active compounds. They moreover possess in themselves sedative, anticonvulsant and hypnotic properties of advantage in human and veterinary medicine.

A further object of the invention is to provide a process of preparing said new compounds. Said process comprises condensing a di-substituted cyanacetyl chloride having the formula:

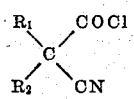

with a substituted malonic acid ester having the formula:

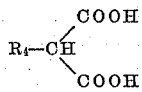

$R_1$, $R_2$ and $R_4$ having the aforementioned significations, thereafter cyclising the product thus obtained into substituted 4-hydroxy-glutaconimide, and thereafter treating the 4-hydroxy-glutaconimide with at least one alkylating compound so as to introduce at least the $R_5$ substituent.

Fig. 2 of the accompanying drawings shows at (d), (e) and (f) the abovementioned stages of the present process, which will be described in detail hereinafter.

The condensation of the disubstituted cyanacetyl chloride (V) and of the ester of the substituted malonic acid (VI), shown in the drawing to be diethyl ester, is effected by a reaction by means of magnesium, in the medium of an ether solvent. It provides a substituted cyanoacetyl-malonic acid diester (VII).

The cyclisation of this diester (stage e) is effected by heating at the temperature of the water bath with a mixture of acetic acid and sulfuric acid. This provides a 4-keto-glutarimide (VIIIa) which is in fact exclusively present in its enolic form of 4-hydroxy-glutaconimide (VIIIb).

The subsequent stage (stage f) is an alkylation reaction, the compound VIIIb being treated by at least an alkylating compound corresponding to the alkyl radical it is desired to introduce; $R_3Y$ and $R_5Z$ designating in the drawing such alkylating compounds which could be, for example, an alkyl sulfate, a diazoalkane, a halide of N-substituted or non-substituted aminoalkyl and alcohol in the presence of a mineral acid such as HCl or $SO_4H_2$.

If it is desired to alkylate the position 4 alone ($R_5$), the known conditions are obtained for the selective alkylation of an enolic group in the presence of an imide group, for example by means of an alcohol in the presence of a mineral acid or by means of a diazoalkane. It is also possible to simultaneously alkylate the two positions 1 and 4 by means of the same alkylating compound, when $R_3$ and $R_5$ are identical, or to alkylate them successively with two alkylating compounds if $R_3$ and $R_5$ are different.

The disubstituted cyanacetyl chlorides (V), which are the starting point of the present process, are, in a general way, new and are also embraced by the scope of the invention as intermediate products. They can be easily obtained by reaction of the corresponding acid, if it is known, with phosphorus pentachloride. It could occur that the acid is new whereas some of its esters are known, in which case one of these esters would be converted into acid before obtaining the chloride of the latter. When no known ester of the disubstituted cyanacetic acid is available, it is first necessary to prepare this ester synthetically from an ester of monosubstituted cyanacetic acid.

Fig. 2 shows at (a), (b) and (c) these auxiliary stages of the present process.

Stage (a) is necessary in the least favourable case when only an ester of monosubstituted cyanacetic acid (II), assumed to be ethyl ester, is known as the starting point. This ester is then condensed with a halide $R_2X$ in the presence of sodium ethylate, which provides the disubstituted ester (III). Of course, in this stage $R_1$ and $R_2$ are interchangeable, the compound II can contain the radical $R_2$ instead of $R_1$ and can be then condensed with the halide $R_1X$.

In stage (b), the compound III obtained by means of stage (a) or directly, if it is known, is hydrolyzed into the corresponding acid (IV).

In stage (c), the acid (IV) is converted into acid chloride by phosphorus pentachloride.

The detailed examples described hereinafter illustrate the invention. It must be understood that the scope of the latter is not intended to be limited to these examples.

EXAMPLE 1

*Preparation of 3-phenyl-3-ethyl-4-methoxyglutaconomide*

(Compound I, $R_1=C_6H_5$, $R_2=C_2H_5$, $R_5=CH_3$, $R_3=R_4=H$)

Stage (b).—*Phenyl-ethyl-cyanacetic acid (Compound IV)*.—The following are mixed in an Erlenmeyer flask:

| | |
|---|---:|
| Ethyl phenyl-ethyl-cyanacetate (Compound III) _g_ _ | 109 |
| Sodium hydroxide 2 N _____ cc_ _ | 550 |
| Ethanol 95° _____ cc_ _ | 550 |

The ethyl phenyl-ethyl-cyanacetate is obtained according to J. S. Chamberlain, J. Am. Chem. Soc. 1935, 57, 352.

After five minutes of contact it is diluted with 3.300 litres of water and the unsaponified part is extracted with ether. The aqueous phase is acidified in an ice bath and is extracted with distilled ether. After drying, treating with carbon black and concentrating until dryness, 95 g. of raw acid are obtained which, by slurrying in one volume of distilled petrol ether provides: 92 g. of acid (yield 97%) having a melting point of 56°–57° C. and an acid number of 99.40–99.60%.

Stage (c).—*Phenyl-ethyl-cyanacetyl chloride (Compound V)*.—The following are mixed:

| | |
|---|---:|
| Phenyl-ethyl-cyanacetic acid _____ g_ _ | 102 |
| Phosphorus pentachloride _____ g_ _ | 165 |

The reaction starts immediately and when it has calmed down there is added:

| | |
|---|---:|
| Anhydrous benzene _____ cc_ _ | 200 |

The mixture is left overnight at room temperature. It is filtered, the filtrate is treated with 20 cc. of anhydrous acetone, concentrated in a vacuum and distilled. The fraction distilling at 96–97° C. under a pressure of 0.6 mm. of mercury is recovered, namely 102 g. of product (yield 91%). The product has the following characteristics:

Boiling point $_{0.6\ mm.}$=96°–97° C.
Cl, percent=16.67% (theoretical: 17.1%)

*Stage (d).—Ethyl 2-phenyl-2-ethyl-2-cyano-malonate (Compound VII).*—The following are introduced in a three-necked flask equipped with a mechanical agitator, a condenser and a dropping funnel:

Magnesium _____ g__ 4
Ethyl malonate (Compound VI) _____ g__ 26.2
Absolute ethanol _____ cc__ 9.6
Anhydrous ether _____ cc__ 135

The reaction is started off by adding 1 cc. of carbon tetrachloride and the mixture is refluxed until the magnesium has disappeared. There are then rapidly introduced with energetic agitation, so that the reflux is maintained spontaneously:

Phenyl-ethyl-cyanacetyl chloride _____ g__ 34
Anhydrous ether _____ cc__ 35

The reflux is maintained 10 minutes after the end of introduction of these compounds. After cooling, the mixture is decomposed with 100 cc. of ice-cold 10% hydrochloric acid, extracted with ether and the ether phase is washed successively with 10% hydrochloric acid and then water. After drying, concentrating and distilling, 39 g. of product are obtained (yield 72%) having the following characteristics:

Boiling point $_{0.04\ mm.}$=141–142° C.
Melting point=38° C.

*Stage (e).—3-phenyl-3-ethyl-4-hydroxy-glutaconimide.* —The following are mixed in a round-bottom flask:

Ethyl-2-phenyl-2-ethyl-2-cyanoacetyl-malonate ___g__ 82
Pure acetic acid _____ cc__ 82
Concentrated sulfuric acid _____ cc__ 82

The mixture is brought to 80° C. for one hour and 82 cc. of acetic acid added. Heating is continued at 80° for 30 minutes (a total of 90 minutes). After cooling, the reaction mixture is poured into 200 cc. of methanol in an ice bath and the whole is then poured into 2.500 litres of water. After filtering, washing until neutral and drying, 57 g. of product are obtained. (Melting point=248°–249° C.)

By crystallization in methanol, the melting point rises to 252–253° C. and remains unchanged by successive crystallizations.

Analysis:
C, percent=67.22–67.12 (theoretical=67.5)
H, percent=5.69–5.73 (theoretical=5.63)
N, percent=6.03–6.01 (theoretical=6.07)
Enol, percent=100 (according to the Meyer method)
Acid number=99.71–99.82%

*Stage (f).*—There is added to a solution of:

3-phenyl-3-ethyl-4-hydroxy-glutaconimide _____g__ 4
Methanol _____ cc__ 240 an ether solution of diazomethane (which performs the function of the compounds $R_5Z$) prepared from 20 g. of nitrosomethylurea. After concentrating until dryness, extracting with water, filtering the precipitate and crystallizing it in 80% ethanol, 1.9 g. of product are obtained (yield: 45%) having the following characteristics:

M.P.=182–184° C.
N, percent=5.72–5.76 (theoretical=5.71)

The melting point is not varied by successive crystallizations in ethanol.

Analysis:
C, percent=68.57–68.62 (calculated=68.6)
H, percent=6.17–6.25 (calculated=6.12)
N, percent=5.73–5.78 (calculated=5.71)

EXAMPLE 2

*Preparation of 1-methyl-3-phenyl-3-ethyl-4-methoxy glutaconimide*

(Compound I, $R_1=C_6H_5$, $R_2=C_2H_5$, $R_3=CH_3$, $R_5=CH_3$, $R_4=H$)

Stages (b) to (e) are identical to those of Example 1.
*Stage (f).*—There is added to a solution of:
3-phenyl-3-ethyl-4-hydroxy-glutaconimide _____g__ 12.5
Potassium hydroxide 6.6 N _____cc__ 24.5
while agitating:
Methyl sulfate (Compound $R_3Y$) _____cc__ 8

The mixture is allowed to react for half an hour and is thereafter brought to 100° C. for a few minutes. After cooling and filtering, there is obtained: 0.3 g. of 1-methyl-3-phenyl-3-ethyl-4-methoxy-glutaconimide. The filtrate is acidified and filtered; and there are thus obtained 13.2 g. of a precipitate which is refluxed with 350 cc. of toluene. The toluenic suspension is filtered hot. The insoluble part (1.5 g.) is constituted of the starting product. After concentration and cooling to ice cold, the filtrate provides the 1-methyl-3-phenyl-3-ethyl-4-hydroxy-glutaconimide: 8.4 g. (M.P.=157–158° C.). By successive crystallizations in 80% ethanol, the melting point is brought to a constant value, namely 158–159° C.

Analysis:
C, percent=68.36–68.21 (theoretical=68.6)
H, percent=6.31–6.24 (theoretical=6.12)
N, percent=5.68–5.75 (theoretical=5.71)
Enol, percent=100% (Meyer method)

The following mixture is refluxed while agitating for 10 minutes:
1-methy-3-phenyl-3-ethyl-4-hydroxy-
  glutaconimide _____g__ 2.5
Sodium hydroxide _____cc__ 8
Methyl sulfate _____cc__ 2

After leaving overnight and filtering the precipitate formed, 1.9 g. of 1-methyl-3-phenyl-3-ethyl-4-methoxy-glutaconimide are obtained: M.P.=124–125° C.

By acidification of the filtrate there is recovered 0.55 g. of starting product, representing a yield of 94%.

By successive crystallizations in ethanol, the melting point is brought to a constant value, namely 129–130° C.

Analysis:
C, percent=69.40–69.51 (calculated=69.5)
H, percent=6.66–6.66 (calculated=6.50)
N, percent=5.39–5.43 (calculated=5.41)
Enol, percent=0 (Meyer method)

EXAMPLE 3

*Preparation of 1.5-dimethyl-3-phenyl-3-ethyl-4-methoxy-glutaconimide*

(Compound I, $R_1=C_6H_5$, $R_2=C_2H_5$, $R_3=R_4=R_5=CH_3$)

Stages (b) and (c) are identical to those of Example 1.
*Stage (d). — Ethyl 2-phenyl-2-ethyl-2-cyano-acetyl-methylmalonate.*—The following are put in a three necked flask equipped with a mechanical agitator, a condenser and a dropping funnel:

Magnesium _____g__ 1.1
Ethyl methyl-malonate (compound VI) _____g__ 8
Absolute ethanol _____cc__ 3.2
Anhydrous ether _____cc__ 25

The reaction is started off by adding a little carbon tetrachloride and is refluxed until the magnesium has completely disappeared. Thereafter, the following are added while energetically agitating so as to maintain a spontaneous reflux:

Chloride of phenyl-ethyl-cyanacetyl _____g__ 9.5
Anhydrous ether _____cc__ 10

The reflux is maintained ten minutes after the end of introduction of these products. After cooling, treating with ice-cold 10% hydrochloric acid and extracting with ether, the ether phase is washed successively with 10% hydrochloric acid and then water. It is dried, concentrated and distilled. The fraction distilling at 150–152° C. under a pressure of 0.1 mm. of mercury is obtained, namely 11.7 g. (yield: 74%).

*Stage (e).*—*3-phenyl-3-ethyl-4-hydroxy-5-methyl-glutaconimide.*—The following are mixed in a round-bottom flask:

Ethyl 2-phenyl-2 - ethyl - 2 - cyano - acetyl - methyl-
  malonate _____g__ 11.7
Pure acetic acid _____cc__ 12
Concentrated sulfuric acid _____cc__ 12

The mixture is brought to 90° C. in a water bath for six hours and poured into ice-cold water. The precipitate formed is then filtered and washed until neutral, providing 7.6 g. of product (yield 91%), M.P.=190–195° C. By crystallization in 80% ethanol, the melting point is brought to a constant value, namely: 198–200° C.

Analysis:
  C, percent=67.91–68.02 (calculated=68.60)
  H, percent=6.16–6.13 (calculated=6.12)
  N, percent=5.60–5.67 (calculated=5.71)

*Stage (f).*—To the following solution:

3 - phenyl - 3 - ethyl - 4 - hydroxy - 5 - methyl - glutaconimide _____g__ 6.3
Potassium hydroxide 7.82 N _____cc__ 39 there is added while agitating:

Methyl sulfate _____cc__ 29.7

The mixture is allowed to react until neutral. It is then alkalinized with several drops of potassium hydroxide, rendered ice cold, and filtered. 4.6 g. of product are obtained having an M.P. of 142–144° C.

By acidification of the filtrate 1.5 g. of initial product are obtained corresponding to a yield of 87%.

By successive crystallizations in ethanol and sublimation under vacuum the melting point is brought to a constant value, namely M.P.=145–146° C.

Analysis:
  C, percent, 69.90–70.01 (theoretical 70.3)
  H, percent 6.97–6.94 (theoretical 6.96)
  N, percent, 5.29–5.31 (theoretical 5.13)

EXAMPLE 4

*Preparation of 1-methyl-3-phenyl-3-ethyl-4-beta-diethyl-aminoethoxy-glutaconimide*

(Compound I, $R_1=C_6H_5$, $R_2=C_2H_5$,
  $R_3=CH_3$, $R_4=H$, $R_5=CH_2CH_2N(C_2H_5)_2$ The starting product is 1-methyl-3-phenyl-3-ethyl-4-hydroxy-glutaconimide obtained in Example 2. The following are put into a three-necked flask equipped with a mechanical agitator, a dropping funnel and a condenser:

Absolute ethanol _____cc__ 120
Sodium _____g__ 1.2

When everything has dissolved, the following is added:

1 - methyl - 3 - phenyl - 3 - ethyl - 4 - hydroxy-glutaconimide _____g__ 12.7

When there is complete dissolution, the following is added:

Chloride of beta-diethylamino-ethyl (compound
  $R_5Z$) _____g__ 8.5

The mixture is then refluxed for six hours and left overnight. The sodium chloride formed is filtered and the filtrate is concentrated in a vacuum. The residue is distilled with ether, washed with diluted sodium hydroxide, and then with water until neutral.

By acidification of the aqueous phase, filtering and washing of the formed precipitate, 2.5 g. of the starting product which did not react, are recovered.

By drying and concentration until dryness of the ether phase, the base is obtained in the form of a syrupy liquid constituting 10.3 g. of product having a base number which is 99.43% of the theoretical number. The base is purified in the form of its acid oxalate prepared in the following manner:

10 g. of raw base are dissolved in 70 cc. of acetone and treated with:

Crystallized oxalic acid _____g__ 3.8
Acetone _____cc__ 30

The oxalate precipitates immediately. It is filtered (11.5 g.) and crystallized into 30 cc. of 95% ethanol. After rendering ice-cold and filtering, the purified acid oxalate is obtained (10.5 g., M.P.=133–136° C.) whence the base is obtained in the usual manner.

By successive crystallizations, the melting point of the acid oxalate is brought to a constant value, namely 136–137° C.

Analysis:
  C, percent=60.76–60.68 (calculated=60.82)
  H, percent=7.04–7.08 (calculated=6.91)
  N, percent=6.65–6.64 (calculated=6.45)

EXAMPLE 5

*Preparation of 3.3-diethyl-4-methoxy-glutaconimide*

(Compound I, $R_1=R_2=C_2H_5$, $R_3=R_4=H$, $R_5=CH_3$)

*Stage (b).*—*Diethyl-cyanacetic acid (Compound IV).*—The following are mixed in an Erlenmeyer flask:

Ethyl diethyl-cyanacetate _____g__ 77
Sodium hydroxide 2 N _____cc__ 350
Ethanol 90° _____cc__ 350 and left in contact for five minutes.

The ethyl diethyl-cyanacetate is obtained in the manner described by Hessler, Am. Chem. J., 1899, 22, 171. It is diluted with 2.100 litres of water and the unsaponified part is extracted with ether. The aqueous phase is acidified in an ice bath and extracted with ether. After drying and concentration until dry, 60 g. of raw acid are obtained, which are purified by distillation, which provides 57 g. of product (yield 90%). The acid has the following physical characteristics:

Boiling point $_{0.3\ mm.}$=108–110° C.
  Melting point=62–64° C.

*Stage (c).*—*Chloride of diethyl-cyanacetyl (Compound V).*—The following are mixed:

Diethyl-cyanacetic acid _____g__ 54
Phosphorus pentachloride _____g__ 120

The reaction commences immediately; when it has calmed down, there are added:

Anhydrous benzene _____cc__ 150 and the mixture is left overnight at room temperature. The mixture is filtered, the filtrate is treated with 20 cc. of anhydrous acetone, concentrated in a vacuum and distilled. The product distilling under a pressure of 20 mm. of mercury at 91–92° C., is obtained, namely 52 g. (yield 86%). The characteristics are as follows:

$B.P._{20\ mm.} = 91\text{–}92°\ C.$
$B.P._{17\ mm.} = 85°\ C.$

*Stage (d).—Ethyl 2.2-diethyl-2-cyano-acetylmalonate (Compound VII).*—The following are put in a three-necked flask equipped with a mechanical agitator, a condenser and a dropping funnel:

| | |
|---|---|
| Magnesium _____ g__ | 6.15 |
| Ethyl malonate (Compound VI) _____ g__ | 40.5 |
| Ethanol _____ cc__ | 17.6 |
| Anhydrous ether _____ cc__ | 150 |

The reaction is started off by addition of 1 cc. of carbon tetrachloride and refluxed until all the magnesium has disappeared. There is then introduced under energetic agitation and at such speed that the reflux is maintained spontaneously:

| | |
|---|---|
| Chloride of diethyl-cyanacetyl _____ g__ | 40 |
| Anhydrous ether _____ cc__ | 50 |

Refluxing is maintained ten minutes after the end of the introduction. After cooling, the mixture is decomposed with 150 cc. of ice-cold 10% hydrochloric acid, extracted with ether, and the ether phase is washed successively with 10% hydrochloric acid and then water. After drying, concentrating and distilling, 29 g. of product are obtained corresponding to the fraction having a $B.P._{0.7\ mm.} = 139\text{–}140°\ C.$

*Stage (e).—3.3-diethyl-4-hydroxy-glutaconimide.*—The following are mixed in a round-bottom flask:

| | |
|---|---|
| Ethyl 2.2-diethyl-2-cyano-acetylmalonate _____ g__ | 40 |
| Pure acetic acid _____ cc__ | 40 |
| Concentrated sulfuric acid _____ cc__ | 40 |

The mixture is put in a water bath for two hours in the course of which a decarboxylation is observed. It is then poured into ice-cold water, filtered, and the precipitate formed is washed, which precipitate weighs 18 g. and melts at 219° C.

By crystallization in 80% ethanol, the melting point rises to 223–224° C. and remains unchanged by successive crystallizations.

Analysis:
C, percent=58.90–59.00 (theoretical=59.0)
H, percent=7.10–7.16 (theoretical=7.10)
N, percent=7.57–7.60 (theoretical=7.65)

*Stage (f).*—The following solution is refluxed for five hours under a bubbling of dry hydrochloric gas:

| | |
|---|---|
| 3.3-diethyl-4-hydroxy-glutaconimide _____ g__ | 35.8 |
| Methanol _____ cc__ | 250 |

It is then concentrated until dry, the residue is distilled with diluted sodium hydroxide, and the solution obtained is treated with carbonic gas; the methoxy derivative precipitates (25.5 g.).

The pure product is obtained by crystallization in ethanol.

M.P.=174–175° C.
C, percent, 60.75, 60.73; calculated 60.9
H, percent, 7.67, 7.68; calculated 7.62
N, percent, 6.91, 6.91; calculated 7.07

By acidification of the aqueous mother lies of the raw product 11.2 g. of the starting product are obtained.

EXAMPLE 6

*Preparation of 3.3-diethyl-4-methoxy-5-methyl-glutaconimide*

(Compound I, $R_1=R_2=C_2H_5$, $R_3=H$, $R_4=R_5=CH_3$)

Stages (a) to (e) may be deduced from those of Example 5.

*Stage (f).*—14.1 g. of 3.3-diethyl-4-hydroxy-5-methyl-glutaconimide are dissolved in 60 cc. of methanol and this solution is treated with an ether solution of diazomethane prepared from 30 g. of nitrosomethylurea. When effervescence has ceased it is concentrated until dry and the residue is treated with diluted sodium hydroxide, extracted with ether so as to eliminate an insoluble and the aqueous fraction is precipitated by the carbonic gas. The O-methylated derivative precipitates (6.7 g.); by crystallization in ethanol the pure product is obtained:

M.P.=168–169° C.
C, percent, 62.67, 62.50; calculated 62.6
H, percent, 8.05, 8.12; calculated 8.06
N, percent, 6.64, 6.69; calculated 6.64

EXAMPLE 7

*Preparation of 3-phenyl-3-methyl-4-methoxy-glutaconimide*

(Compound I, $R_1=C_6H_5$, $R_2=CH_3$, $R_3=R_4=H$, $R_5=CH_3$)

*Stage (a).—Ethyl phenyl-methyl-cyanacetate (Compound III).*—The following are put in a three-necked flask equipped with a mechanical agitator, a dropping funnel and a condenser:

| | |
|---|---|
| Absolute ethanol _____ cc__ | 500 |
| Sodium _____ g__ | 19.6 | then, when the sodium has disappeared, the following is added:

| | |
|---|---|
| Ethyl phenyl-cyanacetate (Compound II) _____ g__ | 161 | then the the following is added:

| | |
|---|---|
| Methyl iodide (Compound $R_2X$) _____ g__ | 145 |

The mixture is heated, while agitating, to 28–30° C. (interior temperature) until neutral (half an hour). After cooling, the sodium iodide formed is filtered and the filtrate concentrated in a vacuum. The residue is distilled with ether and washed with sodium bicarbonate, with diluted sodium bisulfite, and then with water until neutral, and dried.

After concentration and distillation, there is obtained the fraction having a $B.P._{15\ mm.}=147\text{–}149°\ C.$, whence there are obtained 152 g. of product (yield 88%) whose saponification number is: 99.17% to 99.03% of the theoretical number.

*Stage (b).—Phenyl-methyl-cyanacetic acid (Compound IV).*—The following are mixed in an Erlenmeyer flask:

| | |
|---|---|
| Ethyl phenyl-methyl-cyanacetate _____ g__ | 100 |
| Sodium hydroxide 2 N _____ cc__ | 485 |
| Ethanol at 95° _____ cc__ | 485 |

After five minutes of contact, the mixture is diluted by 1500 cc. of water and the unsaponified part is extracted with ether. The aqueous phase is acidified in an ice bath and extracted with distilled ether. After drying, treating with carbon black and concentration until dry, 83 g. of phenyl-methyl(cyanacetic acid are obtained (yield 96%); this acid has a melting point of 93–95° C. and an acid number of 99.52–99.51% of the theoretical number.

*Stage (c).—Phenyl-methyl-cyanacetyl chloride (Compound V).*—The following are mixed:

| | |
|---|---|
| Phenyl-methyl-cyanacetic acid _____ g__ | 72 |
| Phosphorus pentachloride _____ g__ | 128 |

The reaction starts immediately. When it has calmed down, there is added:

| | |
|---|---|
| Anhydrous benzene _____ cc__ | 150 | and the mixture is left overnight at room temperature. It is then filtered and the filtrate treated with 20 cc. of anhydrous acetone, concentrated in a vacuum and distilled. The product distilling under a pressure of 0.8 mm. of mercury at 103–104° C. is obtained, namely 72 g. of product (yield 91%) having a B.P.$_{0.6\text{ mm}}$=96–97° C.

*Stage (d).—Ethyl 2-phenyl-methyl-2-cyano-acetyl-malonate (Compound VII).*—The following are put into a three-necked flask equipped with a mechanical agitator, a condenser and a dropping funnel:

| | |
|---|---|
| Magnesium _____g__ | 5 |
| Ethyl malonate (Compound VI)_____g__ | 32.9 |
| Ethanol _____cc__ | 14.5 |
| Anhydrous ether_____cc__ | 150 |

The reaction is started by adding 1 cc. of carbon tetrachloride and is refluxed until all the magnesium has disappeared. The following are then added under energetic agitation and at speed so that the reflux is maintained spontaneously:

| | |
|---|---|
| Phenyl-methyl-cyanacetyl chloride_____g__ | 40 |
| Anhydrous ether_____cc__ | 50 |

The refluxing is maintained 10 minutes after the end of the introduction. After cooling, the mixture is decomposed by 150 cc. of ice-cold 10% hydrochloric acid, extracted with ether, and the ether phase is washed successively with 10% hydrochloric acid and then water. After drying, concentrating and distilling, there is obtained the fraction having a B.P.$_{0.4\text{ mm}}$=163–164° C., namely 44 g. of product (yield 67%).

*Stage (e).—3-phenyl-3-methyl-4-hydroxy - glutaconimide.*—In a round-bottom flask there are mixed:

| | |
|---|---|
| Ethyl 2-phenyl-2-methyl-2-cyano-acetylmalonate__g__ | 29 |
| Concentrated sulfuric acid_____cc__ | 29 |
| Pure acetic acid_____cc__ | 29 |

The mixture is put in a water bath for 90 minutes and is then poured into ice-cold water. The precipitate formed (17 g.) is filtered and washed.

By crystallization in ethanol, the melting point is brought to 252–253° C. and remains unchanged by successive crystallizations.

Analysis:
  C, percent=66.12–66.25 (theoretical 66.4)
  H, percent=5.26–5.27 (theoretical 5.07)
  N, percent=6.46 (theoretical 6.46)

*Stage (f).*—The following solution is refluxed for five hours under a bubbing of dry hydrochloric acid:

| | |
|---|---|
| 3-phenyl-3-methyl-4-hydroxy-glutaconimide __g__ | 35 |
| Methanol _____cc__ | 1,050 |

After treatment identical to that of Example 5, the desired derivative (32 g.) is obtained; the following pure product is obtained by crystallization in ethanol:

M.P.=219–221°C.
C, percent, 67.30, 67.37; calculated 67.5
H, percent, 5.70, 5.63; calculated 5.63
N, percent, 6.01, 6.12; calculated 6.07

By acidification of the aqueous mother lies of the raw product, 1 g. of the starting product is recovered.

EXAMPLE 8

*Preparation of 3-phenyl-3-ethyl-4-methoxy-5-methyl-glutaconimide*

(Compound I, $R_1=C_6H_5$, $R_2=C_2H_5$, $R_3=H$, $R_4=R_5=CH_3$)

Stages (b) to (e) are identical to those of Example 3.
*Stage (f).*—5 g. of 3-phenyl-3-ethyl-4-hydroxy-5-methyl-glutaconimide are dissolved in 50 cc. of methanol, and an ether solution of diazomethane prepared from 25 g. of nitrosomethylurea is added. When the effervescence has ceased, the mixture is concentrated until dry, the residue is treated with sodium hydroxide, a slight insoluble part is eliminated by filtration and the filtrate is precipitated with $CO_2$. 3.5 g. of the required product are obtained. By crystallization in ethanol, the pure product is obtained.

M.P.=140–141° C.
C, percent, 69.53, 69.45 (calculated 69.5)
H, percent, 6.58, 6.68 (calculated 6.56)
N, percent, 5.50, 5.47 (calculated 5.41)

EXAMPLE 9

*Preparation of 3-phenyl-3-ethyl-4-ethoxy-glutaconimide*

(Compound I, $R_1=C_6H_5$, $R_2=C_2H_5$, $R_3=R_4=H$, $R_5=C_2H_5$)

Stages (b) to (e) are identical to those of Example 1.
*Stage (f).*—The following solution is refluxed for six hours under a bubbling of dry hydrochloric acid:

| | |
|---|---|
| 3-phenyl-3-ethyl-4-hydroxyglutaconimide _____g__ | 20 |
| Ethanol _____cc__ | 600 |

After a treatment identical to that of Example 5, there are obtained 15.5 g. of the required product which is purified by crystallization in 80% ethanol.

M.P.=133–134° C.
C, percent, 69.27, 69.32 (calculated 69.5)
H, percent, 6.66, 6.70 (calculated 6.56)
N, percent, 5.39, 5.43 (calculated 5.41)

By acidification of the aqueous mother lies of the raw product, 5.1 g. of the initial product are recovered.

EXAMPLE 10

*Preparation of 3-phenyl-3-ethyl-4-propoxy-glutaconimide*

(Compound I, $R_1=C_6H_5$, $R_2=C_2H_5$, $R_3=R_4=H$, $R_5=C_3H_{7-n}$)

Stages (b) to (e) are identical to those of Example 1.
*Stage (f).*—The following solution is refluxed for six hours with bubbling of dry hydrochloric gas:

| | |
|---|---|
| 3-phenyl-3-ethyl-4-hydroxyglutaconimide _____g__ | 19.1 |
| Propanol (n)_____cc__ | 600 |

After a treatment identical to that of Example 5, 14 g. of the required product are obtained and are purified by crystallization in 80% ethanol.

M.P.=125–127° C.
C, percent, 70.40, 70.44 (calculated 70.3)
H, percent, 6.99, 7.04 (calculated 6.96)
N, percent, 5.07, 5.11 (calculated 5.13)

By acidification of the aqueous mother lies of the raw product, 6.2 g. of the starting product are recovered.

EXAMPLE 11

*Preparation of 3-phenyl-3-ethyl-4-butoxy-glutaconimide*

(Compound I, $R_1=C_6H_5$, $R_2=C_2H_5$, $R_3=R_4=H$, $R_5=C_4H_{9-n}$)

Stages (b) to (e) are identical to those of Example 1.
*Stage (f).*—The following solution is refluxed for six hours with bubbling of dry hydrochloric gas:

| | |
|---|---|
| 3-phenyl-3-ethyl-4-hydroxy-glutaconimide _____g__ | 25 |
| Butanol (n) _____cc__ | 500 |

After a treatment identical to that of Example 5, 22.9 g. of the required product are obtained and are purified by crystallization in 70% ethanol.

M.P.=124–125° C.
C, percent, 71.00, 70.89 (calculcated 71.08)
H, percent, 7.42, 7.46 (calculated 7.32)
N, percent, 4.92, 4.97 (calculated 4.88)

By acidification of the aqueous mother lies of the raw product, 6.2 g. of the starting product are recovered.

EXAMPLE 12

*Preparation of 3-phenyl-3-propyl-4-methoxy-glutaconimide*

(Compound I, $R_1=C_6H_5$, $R_2=C_3H_7$, $R_3=R_4=H$, $R_5=CH_3$)

*Stage (a).—Ethyl phenyl-propyl-cyanacetate (Compound III).*—The following are put in a three-necked flask equipped with a mechanical agitator, a dropping funnel and a condenser:

| | |
|---|---|
| Absolute ethanol cc | 500 |
| Sodium g | 18.9 |

When the sodium has disappeared, the following is added:

| | |
|---|---|
| Ethyl phenylcyanacetate (Compound II) g | 155 |

Then the following is added:

| | |
|---|---|
| n-Propyl bromide (Compound $R_2X$) g | 121 |

The mixture is refluxed while agitating until it becomes neutral (5 hours). After cooling, the sodium bromide formed is filtered and the filtrate is concentrated in a vacuum. The residue is treated with ether and washed with sodium bicarbonate and then water until neutral.

After concentration and distillation, the fraction having B.P.$_{1mm.}$=122–124° C. is obtained, namely 160 g. of product (yield 85%). The saponification number of the product is 98.80–98.85%.

*Stage (b).—Phenyl-propyl-cyanacetic acid (Compound IV.)*—The following are mixed in an Erlenmeyer flask:

| | |
|---|---|
| Ethyl phenyl-propyl-cyanacetate g | 10 |
| Sodium hydroxide 2 N cc | 43 |
| Ethanol (95°) cc | 43 |

After 35 minutes of contact and then diluting with 360 cc. of water, the unsaponified part is extracted with ether. The aqueous phase is acidified in an ice-bath and is extracted with distilled ether. After drying, treating with carbon black and concentrating until dry, there are obtained 8 g. of phenyl-propyl-cyanacetic acid (yield 97%), M.P.=94–96° C., acid number=98.97–98.80%.

*Stage (c).—Phenyl-propyl-cyanacetyl chloride (Compound V).*—The following are mixed:

| | |
|---|---|
| Phenyl-propyl-cyanacetic acid g | 113 |
| Phosphorus pentachloride g | 173 |

The reaction starts immediately. When it has become calm, there is added:

| | |
|---|---|
| Anhydrous benzene cc | 200 |

The mixture is left overnight at room temperature. The mixture is filtered and the filtrate is treated with 20 cc. of anhydrous acetone. After concentrating in a vacuum and distilling, there is obtained the fraction distilling under a pressure of 1.5 mm. of mercury at 109–110° C., namely 108 g. of product (yield 91%). The product has a B.P.$_{0.8 mm.}$=103–104° C.

*Stage (d).—Ethyl 2-phenyl-2-propyl-2-cyano-acetyl-malonate (Compound VII).*—The following are put into a three-necked flask equipped with a mechanical agitator, a dropping funnel and a condenser:

| | |
|---|---|
| Magnesium g | 4.4 |
| Ethyl malonate (Compound VI) g | 28.9 |
| Absolute ethanol cc | 17.9 |
| Ether cc | 150 |

The reaction is started with 1 cc. of carbon tetrachloride and refluxed until all the magnesium has disappeared. The following are then added while energetically agitating at speed so that the reflux is maintained spontaneously:

| | |
|---|---|
| Phenyl-propyl-cyanacetyl chloride g | 40 |
| Anhydrous ether cc | 50 |

The refluxing is continued for ten minutes after the end of introduction. After cooling, the mixture is decomposed by 150 cc. of ice-cold 10% hydrochloric acid, extracted with ether and the ether phase is washed successively with 10% hydrochloric acid and then water. After drying, concentrating and distilling, there is obtained the fraction having a B.P.$_{0.2 mm.}$=164–165° C., namely 33 g. of product (yield=53%).

*Stage (e).—3 - phenyl - 3 - propyl - 4 - hydroxy - glutaconimide.*—The following are mixed in a round-bottom flask:

| | |
|---|---|
| Ethyl 2-phenyl-2-propyl-2-cyanoacetyl malonate g | 10 |
| Concentrated sulfuric acid cc | 10 |
| Pure acetic acid cc | 10 |

The mixture is brought to 80° C. for 90 minutes and then 10 cc. of acetic acid are added. The heating is continued at 80° for a further 2 hours (a total of 3 hours 30 minutes) and the mixture is then poured into ice-cold water. The precipitate formed is filtered and washed until neutral and represents 6.5 g. of product (yield 92%), M.P.=250° C.

By crystallization in ethanol, the melting point is brought to 255–256° C. and remains unchanged by successive crystallizations.

Analysis:
  C, percent=68.15–68.11 (theoretical 68.6)
  H, percent=6.17–6.26 (theoretical 6.12)
  N, percent=5.69–5.70 (theoretical 5.71)

*Stage (f).*—The following are refluxed for five hours with a bubbling of dry hydrochloric gas:

| | |
|---|---|
| 3-phenyl-3-propyl-4-hydroxy-glutaconimide g | 5.5 |
| Methanol cc | 150 |

After a treatment identical to that of Example 5, 4.2 g. of the required product are obtained and purified by crystallization in ethanol.

M.P.=164–165° C.
C, percent 69.34, 69.44, (calculated 69.5)
H, percent, 6.52, 6.63, (calculated 6.56)
N, percent, 5.31, 5.37, (calculated 5.41)

By acidification of the aqueous mother lies of the raw product, 1 g. of the starting product is recovered.

EXAMPLE 13

*Preparation of 3-phenyl-3-propyl-4-ethoxy-glutaconimide*

(Compound I, $R_1=C_6H_5$, $R_2=C_3H_7$, $R_3=R_4=H$, $R_5=C_2H_5$)

Stages (*a*) to (*e*) are identical to those of Example 12.
*Stage (f).*—The following solution is refluxed for 5 hours with bubbling of dry hydrochloric gas:

| | |
|---|---|
| 3-phenyl-3-propyl-4-hydroxy-glutaconimide g | 20 |
| Ethanol cc | 600 |

After a treatment identical to that of Example 5, 15.2 g. of the required product are obtained and purified by crystallization in 80% ethanol.

M.P.=124–125° C.
C, percent, 70.09, 70.12 (calculated 70.3)
H, percent, 6.89, 6.90 (calculated 6.96)
N, percent, 5.08, 5.17 (calculated 5.13)

By acidification of the aqueous mother lies of the raw product, 5.6 g. of the starting product are recovered.

EXAMPLE 14

*Preparation of 3-phenyl-3-propyl-4-butoxy-glutaconimide*

(Compound I, $R_1=C_6H_5$, $R_2=C_3H_7$, $R_3=R_4=H$, $R_5=C_4H_{9-n}$)

Stages (*a*) to (*e*) are identical to those of Example 12.

Stage (f).—The following solution is refluxed for 5 hours with bubbling of dry hydrochloric gas:

3-phenyl-3-propyl-4-hydroxy-glutaconimide ____g___ 17
Butanol (n) _____cc__ 500

After a treatment identical to that of Example 5, 16 g. of the required product are obtained and purified by crystallization in 70% ethanol.

M.P.=127–128° C.
C, percent, 71.50, 71.45 (calculated 71.76)
H, percent, 7.79, 7.85 (calculated 7.64)
N, percent, 4.63, 4.65 (calculated 4.65)

By acidification of the aqueous mother lies of the raw product, 3.5 g. of the starting product are recovered.

EXAMPLE 15

*Preparation of 1-methyl-3.3-diethyl-4-methoxy-glutaconimide*

(Compound I, $R_1=R_2=C_2H_5$, $R_3=CH_3$, $R_4=H$, $R_5=CH_3$)

The compound obtained in Example 5 is the starting product.

Added to the following solution:

3.3-diethyl-4-methoxy-glutaconimide _____g__ 13.6
Sodium hydroxide N _____cc__ 136 are 12.2 cc. of methyl sulfate and the mixture is left 12 hours while agitating at room temperature. Thereafter, the mixture is filtered and 14.3 g. of the required product are obtained and purified by crystallization in hexane.

M.P.=71–72° C.
C, percent, 62.76, 62.68 (calculated 62.6)
H, percent, 8.19, 8.17 (calculated 8.06)
N, percent, 6.45, 6.46 (calculated 6.64)

EXAMPLE 16

*Preparation of 1.5-dimethyl-3.3-diethyl-4-methoxy-glutaconimide*

(Compound I, $R_1=R_2=C_2H_5$, $R_3=R_4=R_5=CH_3$)

The compound obtained in Example 6 is the starting product.

Added to the following solution:

3.3-diethyl-4-methoxy-5-methyl-glutaconimide __g__ 3.2
Sodium hydroxide N _____cc__ 30.4 are 2.8 cc. of methyl sulfate and the mixture is left 5 hours while agitating at ordinary temperature. Thereafter, the mixture is filtered and 3.1 g. of the required product are obtained and purified by crystallization in petrol ether.

M.P.=55–56° C.
C, percent, 64.21, 64.06 (calculated 64.00)
H, percent, 8.62, 8.66 (calculated 8.44)
N, percent, 6.22, 6.15 (calculated 6.22)

EXAMPLE 17

*Preparation of 1.3-dimethyl-3-phenyl-4-methoxy-glutaconimide*

(Compound I, $R_1=CH_3$, $R_2=C_6H_5$, $R_3=CH_3$, $R_4=H$, $R_5=CH_3$)

The compound obtained in Example 7 is the starting product.

Added to the following solution:

3-phenyl-3-methyl-4-methoxy-glutaconimide ____g__ 2.2
Sodium hydroxide N _____cc__ 19 are 1.85 cc. of methyl sulfate and the mixture is left half an hour while agitating at room temperature. Thereafter, the mixture is filtered and 2.2 g. of the required product are obtained and purified by crystallization in ethanol.

M.P.=113–114° C.
C, percent, 68.68, 68.61 (calculated 68.6)
H, percent, 6.20, 6.15 (calculated 6.12)
N, percent, 5.70, 5.67 (calculated 5.71)

EXAMPLE 18

*Preparation of 1.3-diethyl-3-phenyl-4-methoxy-glutaconimide*

(Compound I, $R_1=C_2H_5$, $R_2=C_6H_5$, $R_3=C_2H_5$, $R_4=H$, $R_5=CH_3$)

The compound obtained in Example 1 is the starting product.

Added to the following solution:

3-phenyl-3-ethyl-4-methoxy-glutaconimide ____g__ 15.7
Sodium hydroxide N _____cc__ 132 are 16.8 cc. of ethyl sulfate and heat is progressively applied while agitating so that 78° C. is reached within half an hour. This temperature is then maintained for three quarters of an hour and then the mixture rendered ice-cold and filtered. 17.5 g. of the required product are thus obtained and purified by crystallization in methanol.

M.P.=135–137° C.
C, percent, 70.17, 70.35 (calculated 70.3)
H, percent, 7.14, 7.09 (calculated 6.96)
N, percent, 5.20, 5.21 (calculated 5.13)

EXAMPLE 19

*Preparation of 1-methyl-3-phenyl-3-ethyl-4-ethoxy-glutaconimide*

(Compound I, $R_1=C_6H_5$, $R_2=C_2H_5$, $R_3=CH_3$, $R_4=H$, $R_5=C_2H_5$)

The compound obtained in Example 9 is the starting product.

Added to a hot solution (65° C.) of:

3-phenyl-3-ethyl-4-ethoxy-glutaconimide _____g__ 14.3
Sodium hydroxide N _____cc__ 113 are 10.4 cc. of methyl sulfate, while agitating during a quarter of an hour so that the temperature does not exceed 80° C. Thereafter 64 cc. of sodium hydroxide N are added and the mixture is left overnight while agitating between 50 and 65° C. and then rendered ice-cold and filtered. 14.7 g. of the required product are thus obtained and are purified by crystallization in hexane.

M.P.=73–74° C.
C, percent, 70.05, 70.12 (calculated 70.3)
H, percent, 6.98, 7.03 (caulculated 6.96)
N, percent, 5.16, 5.15 (calculated 5.13)

EXAMPLE 20

*Preparation of 1-dimethylaminoethyl-3-phenyl-3-ethyl-4-methoxy-glutaconimide*

(Compound I, $R_1=C_6H_5$, $R_2=C_2H_5$, $R_3=C_2H_4N(CH_3)_2$, $R_4=H$, $R_5=CH_3$)

The compound obtained in Example 1 is the starting product.

Added to the following solution:

Sodium _____g__ 3.3
Absolute ethanol _____cc__ 200 are:

3-phenyl-3-ethyl-4-methoxy-glutaconimide _____g__ 16 followed by:

Hydrochlorate of (beta-dimethylamino) ethyl chloride _____g__ 11.3

The mixture is refluxed for 5 hours while agitating. The reaction liquid is then poured into a large volume of water and filtered .17 g. of a solid white product are thus obtained and are dissolved in 10% hydrochloric acid, treated with carbon black and precipitated with sodium hydroxide. After filtering, 15.2 g. of the desired product are obtained and are purified by crystallization in isopropylic ether.

M.P.=85–86° C.
C, percent, 68.29, 68.35 (calculated 68.35)
H, percent, 7.59, 7.60 (calculated 7.59)
N, percent, 8.78, 8.74 (calculated 8.86)

EXAMPLE 21

*Preparation of 1-methyl-3-phenyl-3-propyl-4-methoxy-glutaconimide*

(Compound I, $R_1=C_6H_5$, $R_2=C_3H_7$, $R_3=CH_3$, $R_4=H$, $R_5=CH_3$)

The compound obtained in Example 12 is the starting product.
Added to the following solution:

3-phenyl-3-propyl-4-methoxy-glutaconimide ____g__ 15.6
Sodium hydroxide N _____cc__ 125 are 12 cc. of methyl sulfate, the mixture is left while agitating 12 hours at room temperature and then filtered. 16.5 g. of the desired product are thus obtained and are purified by crystallization in ethanol M.P.=110–111° C.
C, percent, 70.10, 70.28 (calculated 70.3)
H, percent, 6.96, 7.04 (calculated 6.96)
N, percent, 5.00, 5.12 (calculated 5.13)

Although specific examples of the invention have been described, many modifications and changes may be made therein without departing from the scope of the invention, which is defined in the appended claims.

Having now described my invention what I claim as new and desire to secure by Letters Patent is:

1. As new compounds: substituted glutaconimides having the formula:

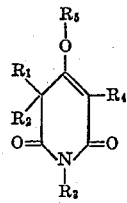

in which $R_1$ and $R_2$ are each a radical selected from the group consisting of phenyl and lower alkyl radicals, $R_3$ is a radical selected from the group consisting of hydrogen, lower alkyl radicals, lower aminoalkyl radicals and lower aminoalkyl radicals substituted at the N atom by lower alkyl radicals, $R_4$ is a radical selected from the group consisting of hydrogen and lower alkyl radicals, and $R_5$ is a radical selected from the group consisting of lower alkyl radicals, lower aminoalkyl radicals and lower aminoalkyl radicals substituted at the N atom by lower alkyl radicals.

2. 3-phenyl-3-ethyl-4-methoxy-glutaconimide.
3. 1-methyl-3-phenyl-3-ethyl-4-methoxy-glutaconimide.
4. 3-phenyl-3-methyl-4-methoxy-glutaconimide.
5. 3-phenyl-3-propyl-4-methoxy-glutaconimide.
6. 3-phenyl-3-propyl-4-ethoxy-glutaconimide.

References Cited in the file of this patent
UNITED STATES PATENTS 2,749,346    Hoffmann et al. _____ June 5, 1956

OTHER REFERENCES

Beilstein: Hand. der. Org. Chem., vol. 2, p. 589, 4th Ed. (1920).